United States Patent [19]
Johnson et al.

[11] Patent Number: 5,114,497
[45] Date of Patent: May 19, 1992

[54] SOIL DECONTAMINATION

[75] Inventors: Paul C. Johnson, Sugarland; James D. Colthart, Houston; Arthur L. Otermat, Houston; David A. Weingaertner, Houston; Charles C. Chou, Houston; Dallas L. Byers, Katy; Stephen M. Stearns, Richmond; Arnold R. Marsden, Jr.; George M. Deeley, both of Houston, all of Tex.

[73] Assignee: Shell Oil Company, Houston, Tex.

[21] Appl. No.: 675,377

[22] Filed: Mar. 26, 1991

[51] Int. Cl.⁵ .............. B08B 5/00; B09B 3/00; E21B 43/16; E21B 43/24
[52] U.S. Cl. ..................... 134/21; 210/922; 405/128; 405/129; 423/659; 423/DIG. 20; 166/248; 166/268; 166/272; 166/306
[58] Field of Search ........... 166/248, 268, 272, 306; 210/922; 405/128, 129; 423/659, DIG. 20; 134/21

[56] References Cited

U.S. PATENT DOCUMENTS

| 3,972,372 | 8/1976 | Fisher et al. | 166/248 |
| 3,989,107 | 11/1976 | Fisher et al. | 166/248 |
| 4,984,594 | 1/1991 | Vinegar et al. | 405/129 |

OTHER PUBLICATIONS

David Rotman "Superfund Cleanup-The Burning Question", Industrial Chemist, Jan. 1988, 26-27.

Primary Examiner—Theodore Morris
Assistant Examiner—Zeinab El-Arini

[57] ABSTRACT

An improved process for the remediation of soil contaminated by the presence therein of organic or semivolatile inorganic contaminants which comprises (1) supplying thermal energy to the soil at one or more locations under the surface of the soil, (2) collecting the vapors resulting from contaminant vaporization or decomposition under the influence of the thermal energy, after passage horizontally through the soil, at one or more locations under the surface of the soil and separating from the collected vapors the environmentally undesirable components thereof.

7 Claims, 1 Drawing Sheet

SOIL DECONTAMINATION

FIELD OF THE INVENTION

This invention relates to an improved in-situ method for the remediation of soil containing organic or semi-volatile inorganic contaminants. More particularly, the invention relates to a method for decontamination of soil containing environmentally undersirable organic or semi-volatile inorganic contaminants, which process employs a more effective vapor-phase removal of such contaminants.

BACKGROUND OF THE INVENTION

A variety of methods have been proposed for the remediation of soil containing organic contaminants. Many of the proposed methods involve excavation and subsequent incineration of soil or thermal desorption of soil contaminants with the attendant difficulties of treatment and/or disposal of off-gases. A major detriment to such processes, however, is the cost of excavating and transporting the soil, which results in a total cost that may approach 1,000 U.S. dollars per ton of soil.

To avoid at least a portion of these costs, several types of in-situ heating processes have been proposed to volatilize and/or decompose soil contaminants. These include vitrification of the soil by electrode heating, steam or hot air heating of the soil through an auger system or through stationary pipes, and radio-frequency or electrical heating of the soil by means of a surface heater.

Brouns et al, U.S. Pat. No. 4,376,598, disclose a vitrification process in which the soil is heated to approximately 1500° C. At or about this temperature the soil forms a glass-like mass which traps the contaminants and any decomposition products therein. This process is, in reality, a stabilization process rather than a decontamination process since the soil undergoing treatment has lost its physical and chemical identity. Both an auger system for injecting steam or hot air and a process for steam injection through stationary pipes have been practiced commercially. These methods have a limited use, primarily in the decontamination of soil containing small areas of deep contamination such as localized spills or leakages at service stations, storage tanks, pumps, and loading facilities. These methods are not as useful when applied to large areas of contaminated soil.

Bridges et al, U.S. Pat. No. 4,670,634, disclose an in-situ thermal process where the thermal energy is supplied by radio-frequency heating. This process is particularly applicable to water-containing soils where the steam generated in the soil serves to strip the organic contaminants from the soil. A somewhat related process is diclosed by copending U.S. patent application Ser. No. 427,418, filed Oct. 27, 1989 now U.S. Pat. No. 4,984,594, wherein the thermal energy is supplied by a relatively flat heater deployed at the surface of the soil. In this latter process, a lowered pressure is applied at the surface of the soil to remove vapors generated within the soil. This method is somewhat inefficient since significant vapor flow takes place largely near the surface of the soil or within a "blanket" placed on the surface of the soil which is more premeable to vapor flow than the soil it covers. It would be of advantage to provide a more effective method of collecting and moving from heated soil the vapors formed when soil contaminated by organic or semi-volatile inorganic contaminants is heated.

SUMMARY OF THE INVENTION

The present invention provides an improved in-situ method for remediation of soil contaminated by undersirable organic contaminants. More particularly, the present invention provides a method whereby a contaminated soil is heated by transfer of heat to the sub-surface soil at one or more first locations extending downwardly into the soil. Upon this application of energy to the soil the vapors formed thereby pass to and are collected at one or more sub-surface second locations, removed from the first locations, where the collected vapors pass from within the soil to the surface of the soil aided at least by application of reduced pressure. The vapors, subsequent to collection, are treated to remove the environmentally undesirable components therefrom.

BRIEF DESCRIPTION OF THE INVENTION

In the present invention, the surface of the soil to be remediated or decontaminated is covered by a layer of insulation which is relatively gas-impermeable compared to the soil and which also covers a relatively flat, relatively flexible source of heat located between the surface of the soil and the insulation. In one modification, elements of the heat source may extend into the soil through one or more soil-free vertical passages. Air is introduced from the surface into the underground through these same veryical passages, either by present or by suction. The heat generated enters the soil by conduction from the surface and at least in part through the one or more soil-free vertical passages where conduction or convection of heated air warms the soil and vaporizes and/or decomposes the organic or inorganic contaminants contained in the soil undergoing heating. The vaporized contaminants and/or gaseous contaminant decomposition products are withdrawn, under the influence of reduced pressure, from the soil through at least one sub-surface, vertical soil-free passage. The collected vapors are treated to remove environmentally undersirable components before release to the atmosphere.

DETAILED DESCRIPTION OF THE INVENTION

Figure 1:
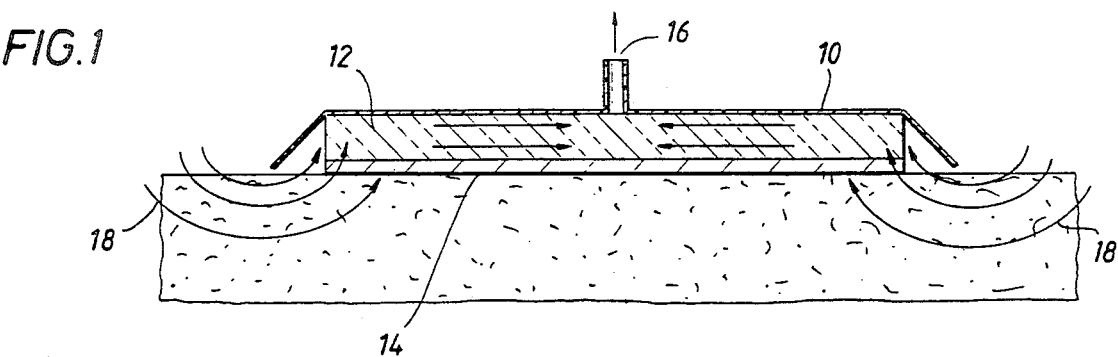
FIG. 1 depicts the decontamination of soil by the process of related U.S. patent application Ser. No. 427,418, filed Oct. 27, 1989, now U.S. Pat. No. 4,984,594, issued Jan. 15, 1991, including impermeable surface sealing means 10, permeable insulation means 12, heating means 14, and vapor removal means 16 via vapor flow path 18.

In the process of the invention, heating means comprising at least a relatively flat, relative flexible heat source supplies thermal energy to the surface of the contaminated soil whose remediation is desired. The head generated by the heat source is passed in considerable part to the soil by conductive or convective heat transfer means which comprise one or more soil-free vertical passages extending from the surface of the soil downwardly into the soil. Air flow is introduced into them, and the heat source may extend into these passages. Under the influence of the heat provided throughout the soil undrgoing remediation, the organic or semi-volatile inorganic contaminants contained in the soil will volatilize, on occasion under the influence of vaporized moisture of the soil, or will decompose to gaseous decomposition products at the elevated temperature of the soil. The vapors which result flow through the soil to one or more vapor collection means which comprise a soil-free vertical passage extending upwardly from the soil to the surface of the soil and thence through the heating means and an opening through the vapor impermeable insulation means which covers the heating means and the soil undergoing remediation. The collection of vapors flowing through the soil is facilitated by pressure reduction means cooperating with the vapor collection means to improve the rate of flow of vapors through the soil and to and upwardly through the vapor collection means. The collected vapors may be treated in vapor separation means to remove from the vapors collected any enviromentally undersirable volatilized contaminant vapors prior to release of the remaining vapor to the environment. Alternatively, the entire air and vaporized contaminants may be combusted.

In somewhat more detail, an area of the surface of soil contaminated with environmentally undesirable organic contaminants is covered with thermal heating means which typically comprises electrically conductive metal connected to a source of electrical power which supplies electrical energy to the heating means. In one embodiment, the heating means is a wire mesh constructed from metal such as stainless steel or nichrome which can tolerate high temperatures. In a second embodiment the heating means is constructed of metal wires, encased in a ceramic fiber cloth sheath, which loop back and forth but do not form a mesh. In a third embodiment, the wires are passed through a number of tubular ceramic pieces which allow the wires to be looped back and forth without bare wires touching one another or the soil. In yet other embodiments, the heating means is a pattern of metal ribbons or strips, or even a thin metal sheet, backed with a suitable material to provide mechanical strength. In each embodiment, vertical heating means may be added for insertion into the one or more vertical soil-free passages extending down into the soil. These vertical heating means may be in the same power circuit as the surface heating, but not necessarily so. The heating means, in order to be compatible with most electrical power sources, should have sufficient resistivity to have a total effective resistance of several ohms and to produce a power density of 20 to 1,000 watts/ft$^2$. The heating means should have sufficient mechanical strength to impart durability when the heating means is dragged or pulled over rough ground. A 325 mesh of 304 stainless steel with wire 0.0014 inch in diameter has been found useful although many other materials, such as NiChrome wire encased in ceramic insulators, are also useful. Depending upon the conductivity of the heating means and the area of soil to be remediated, the heating means is a single section or several section connected in series, in parallel, or in combinations thereof.

Above the heating means is placed relatively vapor-impermeable insulating means employed to reduce heat loss from the heating means to the air above the soil undergoing decontamination. This soil insulating means comprises a sheet or mat, vapor-impermeable as compared with the soil, and is constructed of suitable materials which are insulating and yet do not permit the passage of vapors. Light weight and durability are also desirable characteristics of the soil insulating means. in one embodiment, the soil insulating means comprises a flexible sheet of silicone rubber reinforced with fiberglass or ceramic fibers or other materials which, when fabricated in sheet form, are flexible and vapor impermeable. Illustratively, other polymeric material is useful as a sheet including materials such as TEFLON ®. The required thickness of the sheet will depend upon the temperature at which the soil heating is conducted as well as the nature of the surface of the soil. For ease of positioning, a thin sheet is preferred although thicker sheets provide greater strength and better insulation which may compensate for the greater cost. In an alternative embodiment the soil insulation means comprises a laminate wherein at least the layer employed adjacent to the heating means is constructed of metal foil or other impermeable material and at least one other layer of the laminate is constructed of a material, permeable or impermeable, which has good insulating properties.

The heat transfer means provides heat conduction from the horizontal heat source downwardly from the surface and through one or more soil-free vertical passages extending downwardly from the surface of the soil. The depth to which the heat transfer means extends can be varied and depends upon the nature of the soil as well as the depth of the contamination. From about one foot to about four feet in depth is typical. In one embodiment, the heat transfer means is a vertical opening in the soil in the nature of a well through which air from the surface, warmed by contact with the heating means, passes into the soil. The air flow in such an embodiment is passive, e.g., occurs without the influence of external forces, but alternatively is forced as by air pressured into the heat transfer means by a pump. In an alternate embodiment, the vertical opening is at least partially packed with removable ceramic or metal packing to facilitate heat transfer from the heating means to the soil. In yet another embodiment the heat transfer means is a rod of variable cross-section extending vertically downward from the heating means into the soil. The rod is constructed of corrosion-resistant metal or other material which effectively conducts heat. In another embodiment, the wires, mesh, rods, or sheets extending into passages are also electrically heated.

It is necessary to employ at least one, and on some occasions more than one, heat transfer means to uniformly heat the soil whose decontamination is desired to a depth sufficient to provide the necessary decontamination. The number and relative locations of the heat transfer means, as well as the vapor collection means, will depend at least in part upon the area and the surface shape of the soil undergoing remediation. In one modification, a heat transfer means is placed in the center of a rectangular grid of vapor collection means in order to uniformly heat the soil of a portion of a large area of soil undergoing remediation. In a second embodiment, a heat transfer means is positioned centrally in a plurality of vapor collection means arranged in a circular or semi-circular pattern substantially equidistant from the heat transfer means. In the case of a larger area of soil undergoing decontamination, a plurality of heat transfer means are employed at central locations of a larger grid of vapor collection means.

The temperatture to which the soil is to be heated by transfer of thermal energy from heating means through the heat transfer means and to the soil will depend upon electrical power input, soil volume, vapor flow rate, the moisture content of the soil, and the quantity and nature of the particular soil contaminants. The soil will heat up to the boiling point of water, 100° C. or slighty less depending upon the reduced pressure due to the vapor collection means, and after all the moisture is gone, the soil temperature will rise. In soils of relatively low moisture content or which contain organic or volatile inorganic contaminants of relatively high boiling points it is necessary to employ higher soil heating temperatures. In operation, the process of the invention is capable of generating soil temperatures as high as 1000° C. and thus is useful for removing soil contaminants of high boiling points such as haloorganic pesticides, jet and diesel fuels, crude oil, and polychlorinated benzenes (PCBs). In the case of some soil contaminants, the contaminant will not readily vaporize under the apllied thermal energy but will decompose to form gaseous products such as carbopn dioxide and water which, in effect, "removes" the contamination by means of its destruction. In some cases the rising temperature will cause the contaminant to decompose into products which are more volatile than the parent molecule and thus removed at temperatures well below the boiling point of the parent molecule. Temperatures from about 50° C. to about 500° C. are typically employed to promote loss of soil contaminants regardless of the method by which the contaminants are removed.

When produced, the sub-surface vapors flow through the soil to the vapor collection means which is typically a soil-free vertical passage extending upwardly through the soil from below the surface of the soil and through the heating means and insulating means through openings therein. This flow of vapor through the soil in a generally horizontal direction serves to promote even heating throughout the soil and provides for more uniform and more efficient decontamination of the soil. The flow of vapor horizontally through the soil is promoted by pressure reducing means, typically a vacuum pump, acting in conjunction with the vapor collection means to lower the pressure at or around the vapor collection means. The reduced pressure serves to facilitate the desired flow of vapors as well as somewhat reduce the vaporization temperature of the soil moisture and the soil contaminants. The vapor collection means is operated at ambient soil temperature or its heated to promote continued passage of generated vapors upwardly through and out of the vapor collection means. The number of and the location of the vapor collection means can be varied as is discussed above, but there must be at least one vapor collection means and generally there will be an excess in number of vapor collection means over the number of heat transfer means.

The pressure reducing means is typically a vacuum pump or aspirator connected to the upper end of one or more vapor collection means. The pressure reduction means is positioned at a location uncovered by the heating means and is connected to the vapor collection means by at least one conduit which is typically flexible but may be rigid. The precise pressure to which the pressure reducing means lowers the ambient pressure at or near the vapor collection means is somewhat dependent upon soil properties, and pressures from about 5 psia to about 14.5 psia are typical.

Also in line with the vapor collection means and the pressure reducing means are vapor separation means which serve to separate, transform, capture, or destroy the environmentally undesirable contaminant vapors in those vapors which may be released into the atmosphere without substantial adverse environmental consequences. In one embodiment, the vapor separation means is a scrubber and/or an adsorber which serves to remove by physical methods the undesirable vapor components. In a second embodiment the vapor separation means comprises a decomposition catalyst bed which serves to decompose the contaminant vapors passing through the bed into vapors which can be released into the atmosphere without adverse effect. The scrubber, usually a recirculating liquid scrubber, or the adsorber, a highly surface-active sorbent which is often a bed of activated carbon, is located at a position such that the vapors from the vapor collection means pass through this embodiment of the vapor separation means after collection by the vapor collection means and before or after passage through the pressure reduction means. The choice of scrubber or adsorber is determined by the concentration and properties of the contaminant. Typically, it is operated at a moderate temperature, e.g., from about 10° C. to about 30° C., and it may be necessary to cool the vapors leaving the vapor collection means before entering either of these illustrative vapor separation means. In an alternate embodiment, the vapor separation means is a catalytic degrader serving to remove by chemical degradation the undesirable components of the collected vapors. Such a catalytic unit is operated at an elevated temperature, e.g., from about 200° C. to about 400° C., and the catalytic bed is typically an inorganic oxide such as aluminum oxide or an iron oxide or one of the class of inorganic oxides commonly referred to as clay. The catalytic degrader is suitably located such that the contact with the vapors undergoing separation will occur after exiting the vapor collection means and before or after passing through the pressure reduction means. Alternatively, however, the catalytic degradation bed may be positioned within the vapor collection means by placing a catalytic bed in the vertical passage of the vapor collection means to chemically degrade the contaminant vapors as collected at a sub-surface location. Alternatively, the air and contaminant vapor mix may be passed through an incinerator which may operate at high temperatures, typically 1000° C. By any embodiment of the vapor separation means, an environmentally acceptable vapor is obtained which may then be released to the atmosphere.

DETAILED DESCRIPTION OF THE DRAWINGS

FIG. 1 depicts an in-situ decontamination process of related application Ser. No. 427,418, filed Oct. 29, 1989, now U.S. Pat. No. 4,984,594. In this process, the surface of the soil is covered by a vapor impermeable seal 10 which also covers vapor-permeable insulation 12 and a relatively flat, vapor permeable heater 14. The soil is heated by downward thermal conduction and radiation from the heater 14, and vapors generated by such heating pass upwardly through the soil and the vapor-permeable heater 14 into the vapor-permeable insulation 12 by a path illustrated by the arrows 18. The vapors are removed from the insulation 12 at a point of vapor removal 16 under the influence of a vacuum pump (not shown). The collected vapors are passed to a separator (not shown) where undesirable vapors are removed by physical or chemical means and the remaining vapors are released to the atmosphere.

Figure 2:
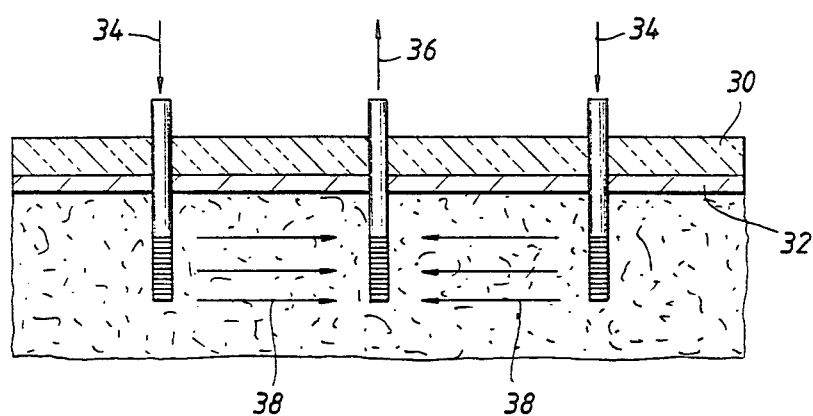
FIG. 2 depicts in comparable manner the process of the invention employing impermeable insulation means 30, heating means 32, heat transfer and air introduction means 34, underground vapor flow 38, and vapor collection means 36. The optional extension of the heating means 32 into the vertical passage 34 is not shown.

FIG. 2 illustrates the improved process of the invention. The soil is covered by vapor-impermeable insulation 30 and a relatively flat heater 32. Heat passes into the soil from the heater by thermal conduction and radiation, but heat is also transferred, to a significant extent, to locations below the surface of the soil by conduction and/or convection through vertical soil-free passages 34. The heat serves to vaporize and/or decompose soil contaminants, initially at or near the passages 34. The passages may be designed to allow air to be sucked in, or blown or pressured in, or it may be closed to the atmosphere. The gaseous contaminants or decomposition products thereof pass horizontally through the soil in the direction indicated by the arrows 38 toward a vapor collector 36 where the pressure has been reduced by a vacuum pump (not shown) attached to the upward end of the collector 36. As the vapors flow horizontally through the soil they serve to transfer heat and to more uniformly heat the soil which results in more uniform and more complete decontamination of the soil being treated. The vapors collected flow upwardly through the vertical passage 36 and through the openings in the heater 32 and insulation 30. Before or after exiting the vapor collector the vapors are treated, physically or chemically, to remove the environmentally undesirable vapors by a vapor separator (not shown).

Figure 3:
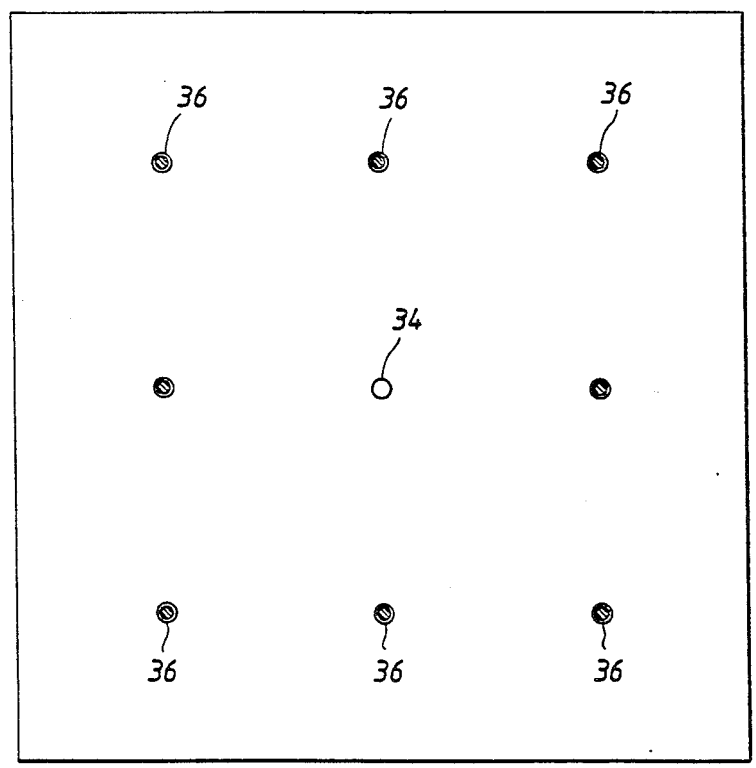
FIG. 3 depicts a view from the surface of the soil of one embodiment of the process of the invention which employs a single heat transfer means 34 and a plurality of vapor collection means 36.

FIG. 3 shows a view from above of one illustrative array of heat transfer passages (light circles) 34 and vapor collectors (dark circles) 36. The soil is initially heated at or near the heat transfer passages 34 and the resulting vapors flow horizontally through the soil to vapor collectors 36 under partial influence of reduced pressure from a vacuum pump (not shown) acting in cooperation with the vapor collectors 36. The collected vapors flow upwardly through the vapor collector 36 to the surface of the soil and are treated during or after exiting the vapor collector 36 in a vapor separator (not shown) to remove undesirable vapors prior to passage of the remaining vapors to the atmosphere.

Various modifications of the present invention will be apparent from the above description which is not intended to be limiting.

What is claimed is:

1. A process for the remediation of soil containing organic or semi-volatile inorganic contaminants which comprises the steps of:
   applying thermal energy to said soil by a heating means;
   transferring a portion of said thermal energy to one or more heat transfer means comprising soil-free vertical passages extending downwardly from the surface of said soil from about 1 foot to about 4 feet;
   vaporizing a portion of said contaminants;
   collecting the vapors resulting from the application of said thermal energy, said collecting being performed by one or more soil-free vertical passages extending upwardly through the soil from below the surface of the soil and removed from said heat transfer passages, said collecting passages operating at reduced pressure;
   separating the environmentally undesirable portion of said collected vapors; and
   passing the remainder of said collected vapors to the atmosphere at or above the surface of said soil.

2. The process of claim 1 wherein the environmentally unacceptable portion of the vapors are separated from the remainder of the vapors by passage through a scrubber or adsorber or by passage through a decomposition catalyst.

3. The process of claim 1 wherein the heating means is an electrically conductive metal connected to a source of electrical power which supplies electrical energy to the heating means.

4. The process of claim 1 wherein air heated by contact with the heating means is forced into said heat transfer means, the air subsequently flowing horizontally through the soil to the vapor collection means and vertically upward through the vapor collection means and through an opening in the heating means and then to a vapor separation means for separation of the environmentally unacceptable vapors before the remainder of the vapors are released to the atmosphere.

5. An apparatus for remediation of soil contaminated with organic or semi-volatile inorganic contaminants comprising:
   heating means placed at the surface of the soil, wherein said heating means comprises an electrically conductive metal connected to a source of electrical power which supplies electrical energy to said heating means;
   vapor-impermeable insulation means covering said heating means;
   heat transfer means for transferring heat from said heating means to one or more locations below the surface of the soil, wherein said heat transfer means comprises one or more soil-free vertical passages extending downwardly from the surface of the soil from about 1 foot to about 4 feet;
   vapor collection means, acting in cooperation with pressure reducing means, for collecting, at reduced pressure and under the surface of the soil, the vapors generated by said heating means, wherein said vapor collection means comprises soil-free vertical passages extending upwardly through the soil from below the surface of the soil; and
   separation means to remove from the collected vapors the environmentally undesirable components thereof.

6. The apparatus of claim 5 wherein the separation means comprises a scrubber, an adsorber or a decomposition catalyst.

7. The apparatus of claim 5 which further includes means to force air over the heating means to said heat transfer means.

* * * * *